(12) United States Patent
Pepper

(10) Patent No.: US 7,382,465 B1
(45) Date of Patent: Jun. 3, 2008

(54) OPTICAL VIBROMETER

(75) Inventor: David M. Pepper, Malibu, CA (US)

(73) Assignee: HRL Laboratories, LLC, Malibu, CA (US)

(*) Notice: Subject to any disclaimer, the term of this patent is extended or adjusted under 35 U.S.C. 154(b) by 119 days.

(21) Appl. No.: 11/511,383

(22) Filed: Aug. 25, 2006

(51) Int. Cl.
G01B 9/02 (2006.01)

(52) U.S. Cl. .................................................. 356/485

(58) Field of Classification Search ............... 356/28.5, 356/426, 477, 482, 484, 485
See application file for complete search history.

(56) References Cited

U.S. PATENT DOCUMENTS

| 5,233,673 | A |   | 8/1993  | Vali et al. ................ 385/3   |
| 6,151,522 | A | * | 11/2000 | Alfano et al. ............. 600/473 |
| 6,233,085 | B1|   | 5/2001  | Johnson .................... 359/279 |
| 6,400,871 | B1| * | 6/2002  | Minden ..................... 385/39  |
| 7,114,393 | B2| * | 10/2006 | Langdon .................... 73/643  |

* cited by examiner

Primary Examiner—Michael A Lyons
(74) Attorney, Agent, or Firm—Ladas & Parry

(57) ABSTRACT

A vibrometer system for determining the vibration spectrum of an object under examination. The vibrometer includes a bundle of optical fibers arranged in an array, wherein a majority of the fibers in the array are arranged to receive light reflected from the object under examination and a minority of the fibers in the array are arranged to transmit light to illuminate the object under examination, wherein the light reflected from the object under test by received by the majority of fibers was transmitted by the minority of fibers; a plurality of light amplifiers and detectors for amplifying and detecting the received light; and a coherent detector responsive to the detected light and to the transmitted light for providing an output signal representative of the vibration spectrum of the object under examination.

18 Claims, 2 Drawing Sheets

OPTICAL VIBROMETER

CROSS REFERENCE TO RELATED PATENTS

This application is related to U.S. Pat. No. 6,400,871, which issued Jun. 4, 2002 to Monica Minden and which patent is owned by the assignee of this application. The disclosure of U.S. Pat. No. 6,400,871 is hereby incorporated herein by reference and is referred to herein as simply "Minden".

TECHNICAL FIELD

This invention is directed to an optical vibrometer with high-sensitivity, with the concomitant ability to compensate for wavefront distortions, either static (speckle) or dynamic in nature (e.g., turbulent atmospheric distortions). An array of fiber amplifiers upstream of the coherent detector provides both enhanced detection performance (as a result of low-noise amplification) as well as closed-loop adaptive optical phasing of a general, highly speckled incident beam to be processed.

BACKGROUND INFORMATION

The purpose of this invention is to realize a means by which one can remotely detect the vibrations of an object using non-contacting techniques involving a laser beam and an optical detection apparatus. One advantage of this invention is that one can measure very small vibrations, on the order of fractions of an optical wavelength in amplitude, over a frequency range on the order of Hz to MHz or more. Another advantage is that this system enables remote sensing to be realized using eye-safe wavelength beams (1.5 µm). Yet another advantage is that this invention enables one to detect vibrations from non-specular objects (e.g., surfaces with roughness features on the order of optical wavelengths) that reflect an incident optical beam into a diffuse set of angles, resulting in a highly speckled pattern of small spots. Still yet another advantage of this invention is that the receiver possesses a set of high-gain, low-noise optical amplifiers as a front-end means to amplify the diffusely scattered beam that enters the receiver, thereby improving the shot-noise-limited sensitivity by two orders of magnitude relative to a conventional multi-speckle compensated vibrometer.

This invention has potential use for remote sensing of vibrating objects without the need for physically contacting the surface under test. This vibrometer can be used for remote sensing of threats (e.g., a UAV can interrogate objects down on the ground such as tanks, minefields, etc.; or, a ground-based platform, say, with a DEW, can interrogate incoming threats to assess its functionality and operational state). In addition, this vibrometer can be used to interrogate objects on the ground (from an airborne location) to ascertain the nature of the materials that comprise the object in question, and, hence classify the object in terms of its functionality (in this case, a second laser, in conjunction with the device disclosed herein, can be employed to excite photo-acoustic modes in the material under interrogation). In addition, one use such an invention for real-time, manufacturing in situ process control, as well as in-service inspection of materials (structures, welds, bonds, etc.) and life-cycle evaluation of smart materials, the latter case referred to as health monitoring of infrastructures via "inspection on demand".

The prior art includes single-speckle vibrometers as well as multi-speckle, compensated vibrometers. In the former case, a laser beam impinges on the object under test, and the receiver is designed to receive a single speckle, which is then directed into a coherent detector (either a homodyne or heterodyne system). This system can be shot-noise limited in sensitivity, but, its overall performance is reduced by $\approx 30$ dB over multi-speckle receivers, since it is only capable of processing a single speckle. The present invention enables one to process many speckles, thereby enhancing the performance of the system. In the latter case, there exist a variety of multi-speckle vibrometer devices, such as self-referencing receivers (using a Fabry-Perot resonator as a multi-speckle FM discriminator), as well as single-speckle vibrometers with adaptive optical front-end devices (such as 2-wave mixers, SLMs, photo-emf sensors, etc.). In these cases, multiple speckles can be processed, but, at the expense in terms of sensitivity (the Fabry-Perot), noise and throughput (in the case of 2-wave mixers), and sensitivity in excess of the shot-noise limit (the photo-emf devices). The present invention enables one to realize shot-noise limited sensitivity, with improved performance beyond existing systems (owing to the front-end low-noise amplifiers), with wavefront-compensation capability. The enhancements derive from the fact that the low-noise front-end fiber amplifiers also provide for adaptive optical compensation of wavefront distortions.

One aspect of the prior art involves single-speckle vibrometers. As such, the extension from a single-speckle receiver to one with multi-speckle processing is not an obvious extrapolation. Therefore, it is our contention that this invention is indeed, novel, and, therefore, is not obvious to those skilled in the art. In terms of the prior art in multi-speckle vibrometers, the front-end devices are either totally passive in nature (such as the self-referencing Fabry-Perot resonators) or, at best, active in the sense that a collection of multiple speckles are processed via beam cleanup or real-time holography. In none of these multi-speckle-based vibrometers is the notion of front-end amplification discussed or implied, rather the prior art here focuses on methods to deal with the highly diffuse and speckled incident beam, without further active processing. The present invention goes beyond the prior art, in that it not only provides a way of processing a highly speckled incident beam, but, also, at the same time (and, also, inherent in the same process as a matter of fact), this invention adds low-noise gain for enhanced shot-noise limited sensitivity by approximately 20 dB (fiber amplifiers can provide small signal gains at $\approx 40$ dB without parasitics).

BRIEF DESCRIPTION OF THE DISCLOSED TECHNOLOGY

The present invention relates to vibrometer system for determining the vibration spectrum of an object under examination. The vibrometer includes a bundle of optical fibers arranged in an array, wherein a majority of the fibers in the array are arranged to receive light reflected from the object under examination and a minority of the fibers in the array are arranged to transmit light to illuminate the object under examination, wherein the light reflected from the object under test by received by the majority of fibers was transmitted by the minority of fibers; a plurality of light amplifiers and detectors for amplifying and detecting the received light; and a coherent detector responsive to the detected light and to the transmitted light for providing an output signal representative of the vibration spectrum of the object under examination.

In another aspect the present invention provides a method for determining the vibration spectrum of an object under examination comprising: illuminating the object under examination with a portion of a diffraction-limited beam of light; receiving light reflected by the object under examination by a bundle of optical fibers arranged in an array; amplifying the received reflected light in said bundle of optical fibers; combining the received reflected light in said bundle of optical fibers onto a single optical fiber; and generating an output signal representative of the vibration spectrum of the object under examination using a coherent optical detector responsive to the amplified received light communicated via said single optical fiber and to another portion of the diffraction-limited beam of light.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

DETAILED DESCRIPTION

Figure 1:
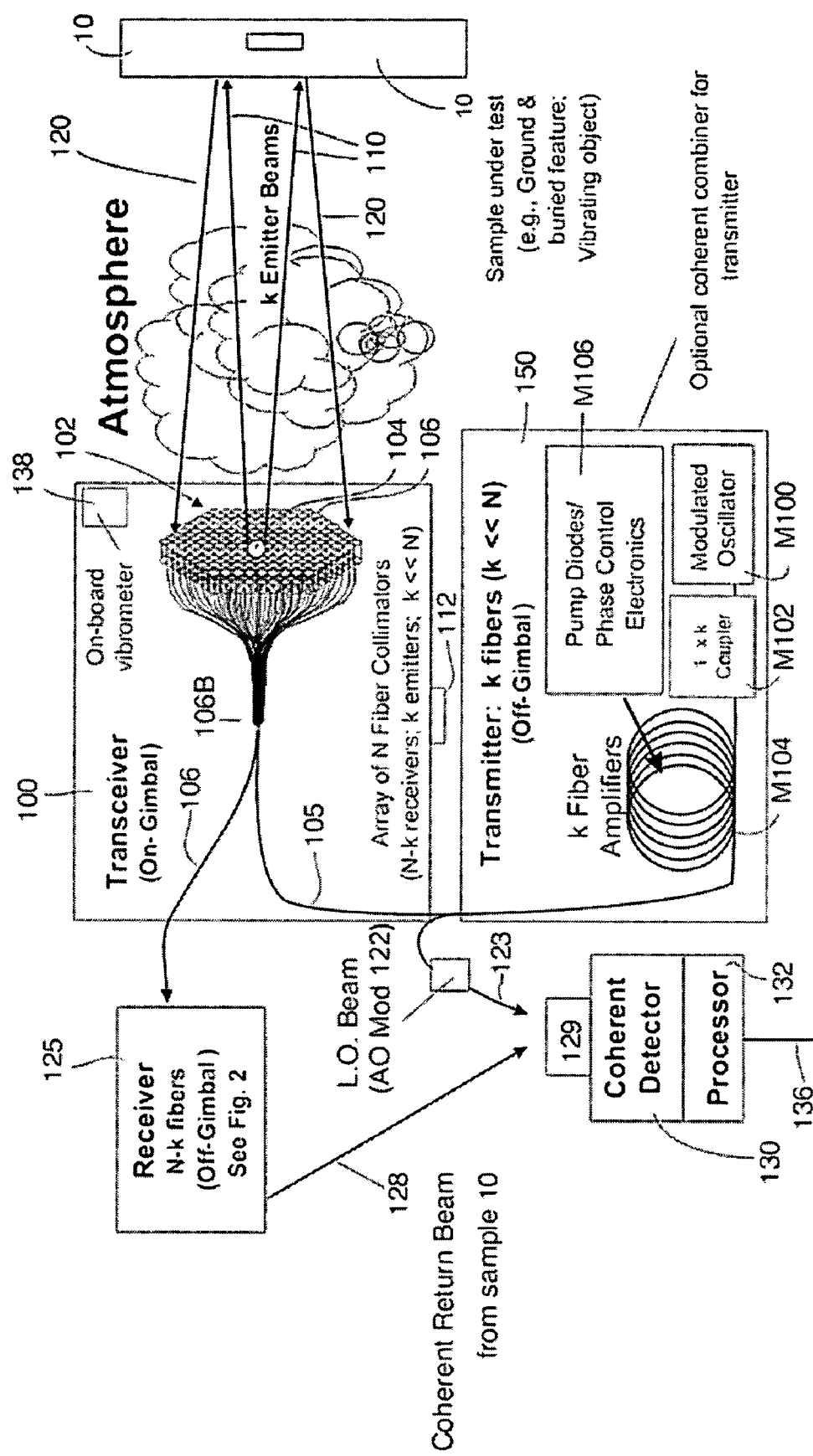
FIG. 1 is a schematic diagram of a compensated optical vibrometer system.
Figure 2:
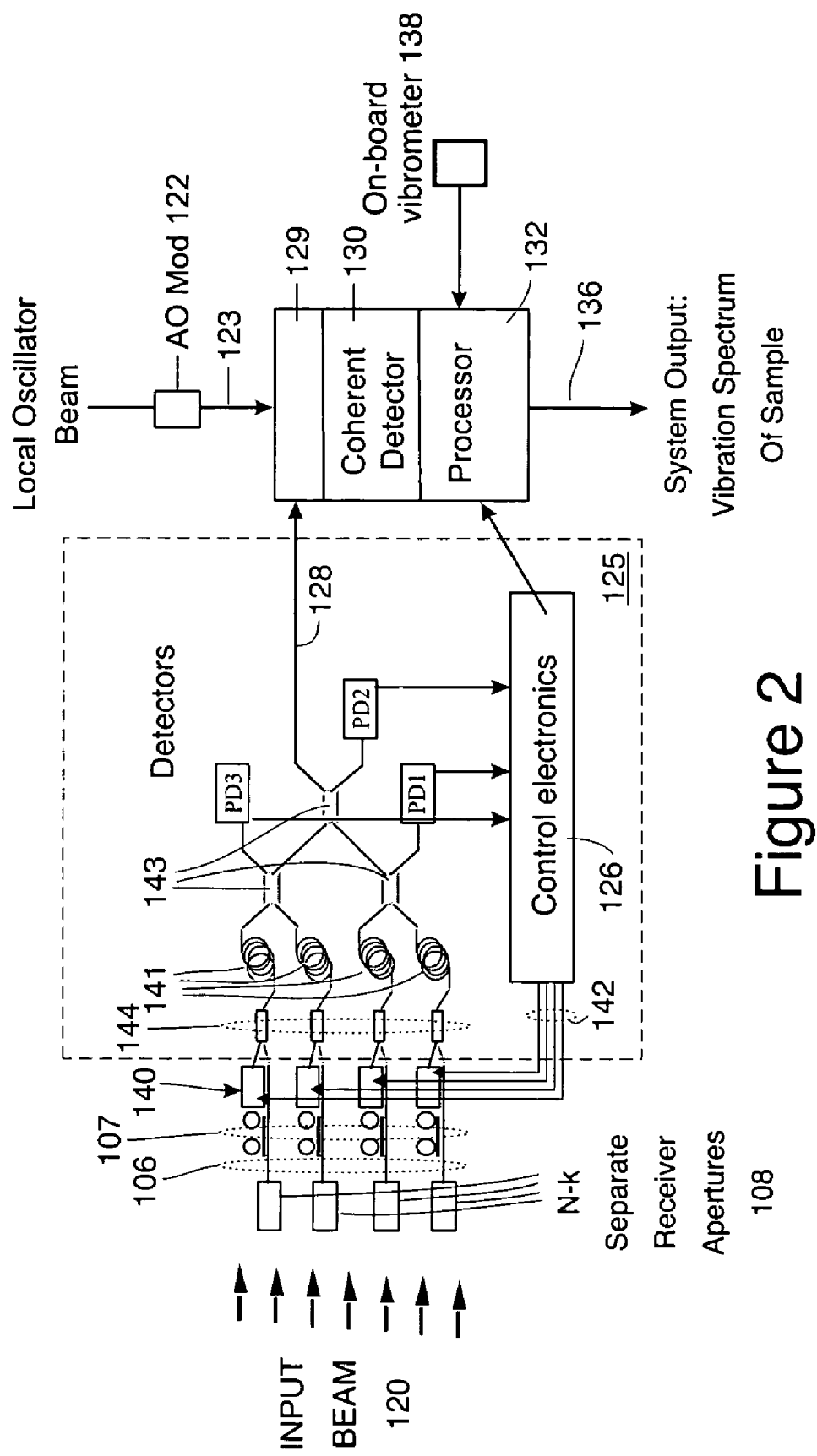
FIG. 2 is a schematic diagram of the receiver portion of the compensated vibrometer system of FIG. 1.

FIGS. 1 and 2 depict a compensated optical vibrometer system which involves, in essence, a two-way laser communication system between a transceiver 100 (the fiber bundle/processor) and the object 10 under interrogation. The object 10 under interrogation is assumed to be in a state of vibration, which can be the result of a transient effect (e.g., the object is "pinged" by another laser, or, possibly is undergoing acoustic emission as a result of in-service stress/fatigue, etc) or can be itself vibrating one or, perhaps, a few acoustic or ultrasonic modes (e.g., a modulated laser may be exciting the sample via a thermoelastic mode, etc.). In all of these cases, one can view the object 10 as being an optical phase modulator, which, upon reflection and/or diffuse scattering of the interrogating beam 110, encodes time varying phase shift(s) onto an interrogating optical beam 110 which is provided by k light-emitting single mode fibers 105 via a centrally-located light transmission port 104 in a bundle or array of individual optical fibers which form a large optical aperture 102.

Some of the resultant light 120, which is reflected and/or scattered by the vibrating object 10, is collected by the large aperture 102 of the transceiver 100, the aperture 102 being formed by a tightly arranged bundle containing N single-mode fibers of which N−k are single-mode light-receiving fibers 106 and k is (are) light-emitting fiber(s) 105 (disposed at port 104) and where k<<N. The transceiver 100 includes an array of N−k fiber amplifiers 141 that drive a coherent detector 130 through a series of fiber combiner/splitters 143 and photodetectors $PD_1$ . . . $PD_{N-k-1}$, as shown in greater detail in FIG. 2, along with a closed-loop control network 126. The proximate ends of the fibers 102 may include lenslets 108 as diagrammatically indicated in FIG. 2. Thus, the N−k single-mode receiver fiber 106 array or bundle will be phased up by the closed loop processor 126, resulting in an intensified single-mode output 128, that forms the input signal to a coherent detector/processor 130, 132. The photodetectors $PD_1$ . . . $PD_{N-k-1}$ (only detectors $PD_1$–$PD_3$ are depicted for simplicity's sake) detect light arriving via fiber combiner/couplers 143 and the aim of the closed-loop control network 126 is to minimize the amount of light detected by the photodetectors $PD_1$ . . . $PD_{N-k-1}$.

Assume that a single fiber 105 (or, a few fibers 105, k, within the array 102, where k<<N) emits the probe or interrogating beam 110 from port 104. The port 104 (and its associated single-mode fiber or fibers 105) may be larger than or the same size as the size of a single light-receiving fiber of array 102, depending on the amount of light which needs to be emitted from port 104. If k=1, then the port 104 and its associated fiber 105 may well have the same size as the size of a single light-receiving fiber or the fiber 105 may be larger. If k>1, then the size of the port 104 will likely increase proportionally and indeed then transmitter 150, which acts as a light generating arrangement for beams 110, is preferably equipped with pump diodes and phase control electronics M106, an oscillator (laser) M100, a 1×k coupler M102 to divide the output of the oscillator M100 onto k fiber amplifiers M104, which are controlled by the pump diodes and phase control electronics M106, to deliver the laser light on the k fibers to port 104. The operation of pump diodes and phase control electronics M106, the k fiber amplifiers M104 and the 1×k coupler M102 preferably follow the teaching of U.S. Pat. No. 6,400,871 to Minden, mentioned above, particularly with reference to FIG. 1 thereof and its related descriptions. Elements M100, M102, M104 and M106 shown on FIG. 1 hereof correspond to elements 100, 102, 104 and 106, respectively, of FIG. 1 of Minden and would preferably be employed if k is greater than 1 in order to keep the k emitter beams at port 104 in phase so that the composite emitted beam 110 emerges as a diffraction limited interrogating beam.

If k=1 then transmitter 150 may be implemented by a single oscillator (laser) instead of using the Minden arrangement discussed above. But for many real world applications, k will be greater than 1 in order to have sufficient light in the interrogating beam 110 to illuminate the object 10 and receive the reflected or scattered light 120.

In any event, port 104 emits a probe or interrogating beam 110 that strikes the object 10 under examination. Given the properties of speckled fields, the speckle return 120 (assuming a focused incident beam) will scatter back toward the receiving fibers 106 in array 102 (which preferably includes the light source at port 104) with a speckle pattern, whose speckle feature size is on the order of the aperture of the incident beam 110. Since all the N−k receiving fibers 106 in the bundle 102 are preferably identical (in terms of physical size, collimators, focusing lenses, etc.), each receiving fiber 106 in the array 102 will "see" a single speckled return. Hence, assuming an array of single-mode fiber amplifiers 141, each of the fibers will detect a "matched" return, which turns out to be a single mode incident onto each fiber aperture 108 (i.e. the end of each receiving fiber 106—see FIG. 2) in the array 102. This situation most optimally fills the allowable mode volume of the array 102, in that a single returned spatial mode is "matched" to that of each of the individual receiving fibers 106 in the array 102. Since the receiving fibers 106 are also amplifying waveguides (e.g. comprise a fiber amplifier 141 as shown in FIG. 2), the return beam will therefore be intensified, with each received speckle amplified preferably by about 40 dB (assume that Amplified Spontaneous Emissions, ASE, effects are minimal (using conventional photonic system design); furthermore, assume that the system is configured so that the light entering each of the fibers 106 in the return path is far below saturation for that given receiving fiber 106). This state of affairs optimizes the efficiency of the system, as well as enabling the system to be relatively covert (i.e., eye safe, and, also low optical fluency outside the transceiver).

The individual fiber amplifiers 141 in the array of amplifiers are each pumped by independent (for example, diode, fiber) lasers 140 using optical combiners 144 as known in the art. In addition to adding gain to the fibers 106, the pump lasers 140 also can modify the optical phase shift experienced by the propagating signal beam through each fiber amplifier 141. U.S. Pat. No. 6,400,871 to Minden, mentioned above, discloses how a closed-loop system built around such a fiber array can serve as a means by which to coherently combine the array in a transmission architecture to enable a single-mode input beam to emerge from an array as diffraction-limited, amplified output beam by the ensemble. The teaching of Minden can be extended, such that an array of amplifiers 141 can serve as a means to coherently combine a front-end, amplifying array in a receiver architecture 125 so as to intensify a weak incident, multi-mode input beam 120, resulting in an intensified, single-mode coherent output beam emerging through the backend of the bundle on a single mode fiber 128, such as is taught herein.

One or more of the k fibers 105 in the bundle are designated as emitter(s), which interrogate the object or sample 10 under examination preferably through a common port 104. Lenslets may be used at the proximate ends of fibers 105 at the array 102. The remainder of the fibers (N−k and hence the majority) in the array serve as a front-end, multi-mode, coherently amplifying module and the light-receiving ends of fibers 106 begin with N−k receiver apertures 108, which may also include lenslets, at the array 102. The resultant, single-mode, amplified output 128 of this fiber bundle 106B is then directed to a coherent detector 130 (homodyne or heterodyne or autodyne), which serves as a vibrometer for measuring vibrations in the sample 10 under examination. The result is that the signal at the vibrometer portion of the system will be enhanced over that of a conventional, single-speckle vibrometer by a factor of (N−k)×G dB, where N−k is the number of fibers 106 in the receiver section 125 of the bundle and G is amount of amplification for each fiber amplifier 141 in dB. Since the gain G can be typically 40 dB for small-signal gain in low-noise Er:glass COTS fibers, the net signal input power to the coherent detection system may well be enhanced by a factor of (N−k)×40 dB. Therefore, for an array of a hundred fibers 106, the net signal power enhancement is 4000 dB, which corresponds to a thousand-fold improvement in the shot-noise-limited sensitivity of the present vibrometer over a conventional vibrometer (the S/N scales as the square root of the input power).

In addition, since the amplification is in the receiver portion 125 of the system, the overall efficiency is improved compared to using a high-power illumination laser, since only a small fraction of this high-power output would ultimately be received, by virtue of highly diffuse scattering typically imposed by many objects 10 (e.g., ground, non-specular component) under interrogation. Also, the system can be more covert, since the interrogation (probe) power may be reduced by at least the same factor as that of the gain in the receiver. The servo-control information in the receiver feedback loops will contain the desired vibration spectral information of the object (the coherent component), as well as spurious, systematic noise (relative platform motion, platform vibration spectra, thermal and mechanical cycling) and incoherent phase noise (due to atmospheric turbulence, dynamic speckle, etc.). This information is fed into the coherent detector 130 (e.g., heterodyne, homodyne, autodyne) and processor, which also provides common-mode rejection of undesirable (coherent) noise via input from an on-board vibrometer 138 (optical, MEMS, accelerometer, etc.)

FIG. 1 depicts the basic architecture of the compensated, high-performance vibrometer. In embodiments where the desired field-of-view exceeds the diffractive spreading of a single-mode fiber in the array 102 (i.e., FOV>λ/fiber-mode-diameter), then the fiber array 102 is preferably mounted on a gimbal or other azimuthal-elevation director (shown schematically by reference numeral 112). The gimbal 112 need only support the low-mass fiber-lenslet array transceiver assembly, 102, and, if desired, the on-board vibrometer, 138. The remaining optical and hardware/processor components of the system may be placed in an off-gimbal housing, if desired. In this manner, the required torque necessary to angularly re-position the gimbal 112 can be greatly reduced, since the major fraction of the system mass and inertia is not mounted on the gimbal 112. This results in a more compact and low-electrical drive power gimbal subsystem (not shown).

Off-gimbal optical probe-beam generating module 150 and receiver processing module 125 are independently coherently combined. In this manner, a diffraction-limited, probe beam 110, which may be of a low-power useful for eavesdropping, for example, interrogates the sample or object 10 under examination, and a high-gain, low-noise coherently combined receiver 125 enables one to receive and process a relatively low-power, low-reflectivity, diffusely scattered return beam from the sample or object (FIG. 2 depicts the receiver module 125). The raw, uncorrected closed-loop feedback information will contain a coherent component (the common vibrations of the sample), an incoherent component (differential phase noise due to turbulence, speckle, etc), as well as possible on-board platform vibrations and relative platform noise (which may be sensed by the on-board vibrometer 138 and utilized for common-mode rejection). A coherent detector 130 and processor 132 sense the desired vibration signal, while preferably compensating for the incoherent noise sources. The term "on-board" refers to those components supported by gimbal 112.

In the case of a heterodyne detection system embodiment, 130, a frequency-shifted (optical) local oscillator reference is required. A reference beam 123 (with a frequency shift greater than the required receiver bandwidth) can be realized by utilizing an acousto-optic modulator 122 (as an example). This optical element 122 can be placed off-gimbal to help minimize mass-loading of the gimbal 112. By using a single-mode optical fiber for the input and output ports of the A.O. modulator 122, the spatial mode of the local oscillator and that of the coherent return beam, 128, will be matched, thus, assuring optimal receiver performance. The local oscillator and coherent return beams 123, 128 may be combined using a 2×1 fiber coupler 129 prior to entering the coherent detector and processor assemblies, 130 and 132, respectively.

An acousto-optic modulator 122 is a standard optical element which is available from a number of commercial sources. Typically, it consists of a crystal and a coupled PZT to generate a traveling sound wave in the crystal, which results in a moving index grating across the input beam that is incident on the crystal. The input optical beam diffracts from this moving grating (into a fixed direction, in present application), and, the diffracted beam (whose output angle is predetermined by the period of the traveling grating) is Doppler shifted by this moving grating. The frequency shift is determined by the speed of the moving grating. The AO modulator 122 can be viewed as a 2-port device: an input optical beam will exit the device into another angle, but, with a well-defined frequency shift (typically in the range of MHz to GHz, depending on the desired vibrometer detection bandwidth).

FIG. 2 depicts the basic architecture of the closed-loop adaptive optical receiver subsystem 125 of the compensated amplifying vibrometer. These components may also be mounted off gimbal 112 to again help minimize mass-loading of the gimbal 112. The ensemble of N–k single-mode, amplifying fibers 106/141 is coherently combined using a servo-controlled closed-loop system controller 126 (it can be servo controlled using, for example, the techniques discussed above and below). In this embodiment, the fiber-amplifier 141 array of phase correcting the individual fiber apertures 108 shown in FIG. 2, whose respective phase shifts are dynamically set in real-time by a corresponding array of pump lasers 140 (which can be compact laser diodes or fiber lasers) via the control electronics module 126. The individual fiber apertures 108 can comprises an array of lenslets each of which focuses the incoming light 120 onto the light-carrying portions of the individual receiving fibers 106 in array 102. The output control levels from the closed-loop system controller 126 drive the pump lasers 140 so that so the outputs from the photodetectors are minimized. The coherent, amplified output is then incident upon the aforementioned coherent detector 130 (in this case, preferably a heterodyne detector). The signal available at the coherent detector 130 has both useful information regarding the target 10 as well as undesirable noise resulting from environmental noise associated with the platform structure for the gear shown in FIGS. 1 and 2. The processor 132 helps to remove this undesirable noise.

The associated processor 132 takes this signal from the coherent detector 130, preferably along with the signal from the on-board vibrometer 138 that senses any systematic platform vibrations. The on-board vibrometer 138 can either be a stand-alone optical or MEMS device, or, can be derived from one of the k transmitter fibers that impinge upon an on-board retro-reflector (not shown) which may be frequency tagged for processor identification. The vibrometer 138 is preferably attached onto the platform structure for the gear shown in FIGS. 1 and 2. The result of the processed information 136 is the vibration spectrum of the object under interrogation is clean as reasonably possible and thus reasonably free of the environmental noise associated with the platform structure.

If the gain of each light amplifier 141 is significantly greater than the gain of each of k fiber amplifier portion(s) M104 in the light generating arrangement 150, then the system provides a low-power illuminator for (i) improved system thermal efficiency (i.e., most of the amplification is provided in the receiver, as opposed to the transmitter, thereby requiring less power), and (ii) reduced detection possibilities when used in covert applications. Generally speaking, it is preferably for the gain to occur mostly (and perhaps exclusively) in the light amplifiers 141 in the receiver as opposed to in the amplifier portion(s) M104 of the transmitter.

The fibers 104 and 106 are preferably polarization preserving. The performance of a coherent optical detector 130 is optimized if all beams (signal 128 and LO 123) are co-polarized. If the optical beams are randomly polarized, then, one can use a polarization-based beam splitter to spatially separate the two orthogonal (say, "S" and "P") polarizations, and then combine each pair of co-polarized beams (one from the signal source and one from the LO) into a pair of coherent detectors, and, then electrically combine the respective demodulated signal outputs. That solution is, of course, more complicated that the solution suggested herein as it requires a pair of coherent detectors, while the embodiment of FIG. 1 only requires a single coherent detector 130, in addition to the polarization-based beam splitter and electronics needed to combine the demodulated signals. And, on the other hand, if no measures are taken to assure co-polarization of the signal 128 and LO 123 beams, then "S" polarized photons add background noise to the detection of the "P" polarized photons, and, vice versa, thereby reducing the sensitivity of the disclosed vibrometer.

In FIG. 2 there is depicted a polarization controller 107 associated with each fiber 106. The polarization controller is preferably present for the reasons discussed above: polarization control throughout the system will improve the performance of the disclosed vibrometer.

From the foregoing description, it will be apparent that the present invention has a number of advantages, some of which have been described above, and others of which are inherent in the embodiments of the invention described above. Also, it will be understood that modifications can be made to the invention described without departing from the teachings of subject matter described herein. As such, the invention is not to be limited to the described embodiments except as required by the appended claims.

What is claimed is:

1. A vibrometer system for determining the vibration spectrum of an object under examination, the vibrometer comprising:

a bundle of optical fibers arranged in an array, wherein a majority of the fibers in the array are arranged to receive light reflected from the object under examination and a minority of the fibers in the array are arranged to transmit light to illuminate the object under examination with transmitted light, wherein light reflected from the object under examination and received by the majority of fibers was transmitted by the minority of fibers in said bundle;

a plurality of light amplifiers for amplifying the received reflected light; and a coherent detector responsive to the amplified received light and to the transmitted light for providing an output signal representative of the vibration spectrum of the object under examination.

2. The vibrometer system of claim 1 wherein the minority of the fibers in the array comprises one single mode optical fiber and wherein the majority of the fibers in the array comprises a plurality of single mode optical fibers.

3. The vibrometer system of claim 1 further including an on-board vibrometer and a processor, the processor being coupled to the coherent detector and to the on-board vibrometer and being arranged to perform common-mode rejection of undesirable on-board noise sensed by the on-board vibrometer.

4. The vibrometer system of claim 3 further including:

a plurality of photodetectors coupled to said plurality of light amplifiers via a plurality of optical combiners/splitters, the plurality of optical combiners/splitters being arranged in a tree-like structure, the tree-like structure of optical combiners/splitters having one output coupled to said coherent detector and a plurality of additional outputs with each additional output being each coupled to one of the photodetectors in said plurality of photodetectors;

a plurality of pump lasers associated with the plurality of light amplifiers; and control electronics responsive to outputs of the plurality of photodetectors for controlling the phase of the pump lasers to minimize voltages occurring at the outputs of the plurality of photodetectors.

5. The vibrometer system of claim 4 wherein:
the bundle of optical fibers comprise N single-mode fibers;
the minority of fibers comprise k single-mode fiber(s);
the majority of fibers comprise N–k single-mode fibers;
the plurality of light amplifiers comprises N–k fiber amplifiers; and
the plurality of coupler/splitters comprise N–k–1 coupler/splitters;
where k<<N.

6. The vibrometer system of claim 5 wherein the k single mode fiber(s) are driven by a light generating arrangement including:
a modulated optical oscillator;
a 1×k optical coupler coupled to the modulated optical oscillator;
wherein the k single mode fiber(s) include k fiber amplifier portion(s) in said light generating arrangement, the k fiber amplifier portions being pumped by k pump laser(s); the k single mode fiber(s) being coupled to receive light from the 1×k coupler, and
phase control electronics for generating a diffraction limited optical beam via the k single mode fiber(s), the diffraction limited optical beam providing the transmitted light for illuminating the object under examination.

7. The vibrometer system of claim 6 wherein the light generating arrangement is coupled to a splitter for splitting off a relatively small amount of the light generated thereby, the relatively small amount of light being communicated to said coherent detector via an AO modulator.

8. The vibrometer system of claim 6 wherein said plurality of light amplifiers each has a greater gain than does each of said k fiber amplifier portion(s) in said light generating arrangement.

9. The vibrometer system of claim 1 wherein the bundle of optical fibers is gimbal mounted for coarse azimuth and elevation angular control of the bundle of optical fibers, where a desired field-of-view exceeds the diffractive output angle of a single fiber in said bundle of optical fibers.

10. The vibrometer system of claim 1 wherein the bundle of optical fibers comprise polarization-preserving fibers.

11. The vibrometer system of claim 10 wherein the bundle of optical fibers comprise polarization-preserving fibers and associated polarization controllers to assure that all received optical beams in said bundle are co-polarized.

12. A method for determining the vibration spectrum of an object under examination comprising:
illuminating the object under examination with a portion of a diffraction-limited beam of light;
receiving light reflected by the object under examination by a bundle of optical fibers arranged in an array;
amplifying the received reflected light in said bundle of optical fibers;
combining the received reflected light in said bundle of optical fibers onto a single optical fiber;
generating an output signal representative of the vibration spectrum of the object under examination using a coherent optical detector responsive to the amplified received light communicated via said single optical fiber and to another portion of the diffraction-limited beam of light.

13. The method of claim 12 wherein the object under examination is illuminated by a minority of single mode optical fibers in an array and the bundle of optical fibers comprise a majority of single mode fibers in said array, said array of single mode optical fibers forming a single optical aperture for interrogating the object under examination.

14. The method of claim 12 further including sensing on-board noise and processing an output signal of the coherent optical detector by common-mode rejection to suppress the sensed on-board noise.

15. The method of claim 12 wherein the amplifying and combining the received reflected light in said bundle of optical fibers is accomplished by:
providing a plurality of pump lasers associated with the bundle of optical fibers for amplifying light in the bundle of optical fibers;
providing a plurality of photodetectors coupled to bundle of optical fibers via a plurality of optical combiners/splitters;
arranging the plurality of optical combiners/splitters being in a tree-like structure, the tree-like structure of optical combiners/splitters having one output coupled to said coherent optical detector and a plurality of additional outputs with each additional output being each coupled to one of the photodetectors in said plurality of photodetectors; and
controlling the phase of the pump lasers to minimize voltages occurring at outputs of the plurality of photodetectors.

16. The method of claim 15 wherein:
the bundle of optical fibers comprise N single-mode fibers;
the minority of fibers comprise k single-mode fiber(s);
the majority of fibers comprise N–k single-mode fibers;
the plurality of light amplifiers comprises N–k fiber amplifiers; and
the plurality of coupler/splitters comprise N–k–1 coupler/splitters;
where k<<N.

17. The method of claim 16 wherein the k single mode fiber(s) are driven by a light generating arrangement including a modulated optical oscillator, a 1×k optical coupler coupled to the modulated optical oscillator, wherein the k single mode fiber(s) include k fiber amplifier portion(s) in said light generating arrangement, the k fiber amplifier portions are pumped by k pump laser(s) and the k single mode fiber(s) are coupled to receive light from the 1×k coupler; the method further including:
generating said diffraction-limited beam of light via the k single mode fiber(s).

18. The method of claim 17 wherein the light generating arrangement is coupled to a splitter for splitting off a relatively small amount of the light generated thereby, the relatively small amount being communicated to said coherent detector via an AO modulator.

* * * * *